United States Patent
Kaneyoshi

(10) Patent No.: US 10,214,687 B2
(45) Date of Patent: Feb. 26, 2019

(54) METHOD FOR PRODUCING AND METHOD FOR PROCESSING COMPLEX FLUORIDE PHOSPHOR

(71) Applicant: SHIN-ETSU CHEMICAL CO., LTD., Tokyo (JP)

(72) Inventor: Masami Kaneyoshi, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 350 days.

(21) Appl. No.: 15/113,889

(22) PCT Filed: Jan. 15, 2015

(86) PCT No.: PCT/JP2015/050909
§ 371 (c)(1),
(2) Date: Jul. 25, 2016

(87) PCT Pub. No.: WO2015/115189
PCT Pub. Date: Aug. 6, 2015

(65) Prior Publication Data
US 2016/0347998 A1    Dec. 1, 2016

(30) Foreign Application Priority Data

Jan. 30, 2014 (JP) ................................. 2014-015627
Jul. 2, 2014 (JP) ................................. 2014-136703

(51) Int. Cl.
*C09K 11/61* (2006.01)
(52) U.S. Cl.
CPC .......... *C09K 11/617* (2013.01); *C09K 11/616* (2013.01)
(58) Field of Classification Search
CPC ................................................ C09K 11/617
See application file for complete search history.

(56) References Cited

U.S. PATENT DOCUMENTS

| 3,576,756 A | 4/1971 | Russo |
| 7,648,649 B2 | 1/2010 | Radkov et al. |
(Continued)

FOREIGN PATENT DOCUMENTS

| JP | 2009-528429 A | 8/2009 |
| JP | 2009-280763 A | 12/2009 |
(Continued)

OTHER PUBLICATIONS

"Inorganic Compound Synthesis III", Shin Jikken Kagaku Kōza 8 [New experimental chemistry series 8] (edited by The Chemical Society of Japan), Maruzen, Inc., 1977, 2 pgs. with the English translation.
(Continued)

*Primary Examiner* — Matthew E. Hoban
(74) *Attorney, Agent, or Firm* — Birch, Stewart, Kolasch & Birch, LLP

(57) ABSTRACT

Provided is a method for producing a red phosphor which is a Mn-activated complex fluoride represented by formula (1), $A_2MF_6$:Mn (1) (M is one type or more of a tetravalent element selected from Si, Ti, Zr, Hf, Ge, and Sn, and A is one type or more of an alkali metal selected from Li, Na, K, Rb, and Cs, and includes at least Na and/or K.), wherein, as a reactive source, a solid of a complex fluoride represented by formula (2), $A_2MF_6$ (2) (M and A are as described above) and a solid of a manganese compound represented by formula (3), $A_2MnF_6$ (3) (A is as described above) are mixed and heated at a temperature of from 100° C. to 500° C. According to the present invention, a Mn-activated complex fluoride phosphor having favorable luminescence properties can be obtained without using hydrofluoric acid in a main step.

6 Claims, 4 Drawing Sheets

(56) References Cited

U.S. PATENT DOCUMENTS

| | | |
|---|---|---|
| 8,427,042 B2 | 4/2013 | Hata et al. |
| 8,974,696 B2 | 3/2015 | Kaneyoshi et al. |
| 2010/0142189 A1 | 6/2010 | Hong et al. |
| 2013/0271960 A1 | 10/2013 | Hong et al. |
| 2015/0132585 A1* | 5/2015 | Pan ............ C04B 35/2675 428/446 |
| 2015/0380613 A1* | 12/2015 | Hiramatsu ........ C09K 11/617 257/98 |

FOREIGN PATENT DOCUMENTS

| | | |
|---|---|---|
| JP | 2010-45328 A | 2/2010 |
| JP | 2010-209311 A | 9/2010 |
| JP | 4582259 B2 | 11/2010 |
| JP | 2012-224536 A | 11/2012 |
| WO | WO 2013/158929 A1 | 10/2013 |

OTHER PUBLICATIONS

Bode et al., "About a new synthesis of potassium hexafluoromanganate (IV)", Angew. Chem., vol. 65, May 1953, 8 pgs. with the English translation.

Cox et al., "Complex Fluorides. Part II. Studies on Fluoroferrates and on Hydrogen Bonding in Complex Fluorides", J. Chem. Soc., Jan. 1954, pp. 1798-1803.

Hoppe et al., "About fluoromanganates of alkali metals1", Magazine of inorganic and general chemistry, vol. 307, 1961, 47pgs. with the English translation.

Huss et al., "Manganese, chromium and vanadium complexes", Magazine of inorganic chemistry, vol. 262, 1950, 29 pgs. with the English translation.

International Search Report for PCT/JP2015/050909 dated Mar. 10, 2015.

\* cited by examiner

— MIXED POWDER
----- HEATED, UNWASHED POWDER
— WASHED AND DRIED POWDER

METHOD FOR PRODUCING AND METHOD FOR PROCESSING COMPLEX FLUORIDE PHOSPHOR

TECHNICAL FIELD

This invention relates to a method for producing manganese-activated complex fluoride red phosphors (referred to below as "complex fluoride phosphors") of the formula $A_2MF_6$:Mn (wherein M is one or more tetravalent element selected from among silicon, titanium, zirconium, hafnium, germanium and tin, and A is one or more alkali metal selected from among lithium, sodium, potassium, rubidium and cesium, and includes at least sodium and/or potassium), which are useful as red phosphors for blue LEDs. The invention also relates to a method for treating such phosphors.

BACKGROUND ART

Red-emitting phosphors that are excited by light corresponding to near-UV to blue light-emitting diodes (LEDs) are needed to improve the color rendering properties of white LEDs or, when white LEDs are used as the backlights in liquid crystal displays, to enhance color reproducibility, and are being studied for this purpose. In particular, JP-A 2009-528429 (Patent Document 1) mentions that complex fluoride phosphors obtained by adding manganese to a complex fluoride of the formula $A_2MF_6$ (wherein A is, for example, sodium, potassium or rubidium, and M is, for example, silicon, germanium or titanium) are useful.

Patent Document 1 discloses one method for producing such phosphors wherein a hydrofluoric acid solution in which all of the constituent elements have been dissolved or dispersed is concentrated by evaporation, inducing precipitation. In another production method, disclosed in U.S. Pat. No. 3,576,756 (Patent Document 2), hydrofluoric acid solutions in which the respective constituent elements have been separately dissolved are mixed together, following which acetone (a water-soluble organic solvent) is added, lowering the solubility and thereby inducing precipitation. In addition, JP No. 4582259 (Patent Document 3) and JP-A No. 2012-224536 (Patent Document 4) disclose methods wherein the element M and the element A in the above formula are each dissolved in separate hydrofluoric acid-containing solutions, manganese is added to either one of these solutions, and the solutions are mixed together, thereby inducing precipitation of the phosphor.

Processes for producing the above known manganese-doped complex fluoride phosphors of the formula $A_2MF_6$ (wherein A is, for example, Na, K or Rb; and M is, for example, Si, Ge or Ti) mentioned above, including the processes described in the foregoing literature, use a considerable amount of high-concentration hydrofluoric acid relative to the amount of phosphor to be obtained in the phosphor-forming operation. Because hydrofluoric acid is strongly corrosive, it places limitations on, for example, the reactor materials, which may lead to problems when trying to carry out large-scale production. Moreover, hydrofluoric acid is strongly toxic to the human body and so, from the standpoint as well of concerns over the safety of workers handling this chemical, there are obstacles to scaling up chemical processes which use hydrofluoric acid.

In addition, it has been pointed out that the emission characteristics of such complex fluoride phosphors may deteriorate under high temperature and high humidity. Along with mentioning this, JP-A No. 2009-280763 (Patent Document 5) also states that the problem of moisture resistance can be alleviated by including a step that entails, at the time of LED fabrication, mixing and molding the phosphor together with a silicone resin. Also, JP-A 2010-45328 (Patent Document 6) teaches that the problem of moisture resistance is alleviated by covering these complex fluoride phosphors with a resin or the like prior to LED fabrication.

However, there exists a desire for an advantageous method to further increase the moisture resistance.

SUMMARY OF THE INVENTION

Problems to be Solved by the Invention

Accordingly, one object of this invention is to provide a method for producing a complex fluoride phosphor, in which key portions of the complex fluoride phosphor production process can be carried out by steps that do not use hydrofluoric acid. Another object of the invention is to provide a method for treating a complex fluoride phosphor that can further increase the moisture resistance.

Means for Solving the Problems

The inventor has carried out extensive investigations in order to achieve these objects and discovered as a result that, when producing a red phosphor which is a manganese-activated complex fluoride, instead of relying substantially on a wet process, it is effective to make use of a dry process that, by mixing together and heating the subsequently described raw material powders, gives rise to the diffusive movement of matter, forming the target complex fluoride phosphor. By examining the conditions and other factors of such a process, the inventor ultimately arrived at the present invention.

The inventor has additionally found that red phosphors which are a manganese-activated complex fluorides produced by this dry process have a better moisture resistance than complex fluoride red phosphors produced by a wet process, and moreover that, by adding to an already manufactured complex fluoride red phosphor an additive which promotes the diffusion of matter and heat treating, the moisture resistance of the phosphor can be improved.

Accordingly, the invention provides the following complex fluoride phosphor production method and complex fluoride phosphor treatment method.

[1] A method for producing a red phosphor that is a manganese-activated complex fluoride represented by the formula (1):

$$A_2MF_6\text{:Mn} \qquad (1)$$

wherein M is one or more tetravalent element selected from the group consisting of silicon, titanium, zirconium, hafnium, germanium and tin, and A is one or more alkali metal selected from the group consisting of lithium, sodium, potassium, rubidium and cesium, and includes at least sodium and/or potassium, the method comprising the steps of:

mixing, as reaction raw materials, a solid of a complex fluoride represented by the formula (2):

$$A_2MF_6 \qquad (2)$$

wherein M is one or more tetravalent element selected from the group consisting of silicon, titanium, zirconium, hafnium, germanium and tin, and A is one or more alkali metal selected from the group consisting of lithium, sodium, potassium, rubidium and cesium, and includes at least sodium and/or potassium, and a solid of a manganese compound represented by the formula (3):

$$A_2MnF_6 \qquad (3)$$

wherein A is one or more alkali metal selected from the group consisting of lithium, sodium, potassium, rubidium and cesium, and includes at least sodium and/or potassium, and heating the mixture at a temperature of at least 100° C. and not above 500° C.

[2] The method for producing a manganese-activated complex fluoride phosphor of [1], wherein the mixture is combined with a solid of a hydrogenfluoride represented by the formula (4):

$$A^1F \cdot nHF \qquad (4)$$

wherein $A^1$ is one or more alkali metal or ammonium selected from the group consisting of sodium, potassium, rubidium and $NH_4$, and n is a number that is at least 0.7 and not more than 4, and heating the mixture.

[3] The method for producing a manganese-activated complex fluoride phosphor of [1] or [2], wherein the reaction raw materials are heated and reacted in a ceramic vessel, or in a reaction vessel having a portion formed of fluoropolymer that comes into contact with the mixture.

[4] The method for producing a manganese-activated complex fluoride phosphor of any one of [1] to [3], wherein the reaction mixture obtained by heating is washed with an inorganic acid solution or a fluoride solution to remove unnecessary components, and then performing solid-liquid separation and drying the solid.

[5] A method for treating a manganese-activated complex fluoride phosphor, comprising the steps of:
  mixing a red phosphor that is a manganese-activated complex fluoride represented by the formula (1):

$$A_2MF_6:Mn \qquad (1)$$

wherein M is one or more tetravalent element selected from the group consisting of silicon, titanium, zirconium, hafnium, germanium and tin, and A is one or more alkali metal selected from the group consisting of lithium, sodium, potassium, rubidium and cesium, and includes at least sodium and/or potassium, and a solid of a hydrogenfluoride represented by the formula (4):

$$A^1F \cdot nHF \qquad (4)$$

wherein $A^1$ is one or more alkali metal or ammonium selected from the group consisting of sodium, potassium, rubidium and $NH_4$, and n is a number that is at least 0.7 and not more than 4, and heating the mixture.

[6] The method for treating a manganese-activated complex fluoride phosphor of [5], wherein the reaction raw materials are heated and reacted in a ceramic vessel, or in a reaction vessel having a portion formed of fluoropolymer that comes into contact with the mixture.

[7] The method for treating a manganese-activated complex fluoride phosphor of [5] or [6], wherein the reaction mixture obtained by heating is washed with an inorganic acid solution or a fluoride solution to remove unnecessary components, and then performing solid-liquid separation and drying the solid.

Advantageous Effects of the Invention

The production method of the invention enables a manganese-activated complex fluoride phosphor having good emission characteristics to be obtained without using hydrofluoric acid in the main steps. The treatment method of the invention enables a manganese-activated complex fluoride phosphor having an excellent moisture resistance to be obtained.

BRIEF DESCRIPTION OF THE DIAGRAMS

EMBODIMENT FOR CARRYING OUT THE INVENTION

Figure 1:
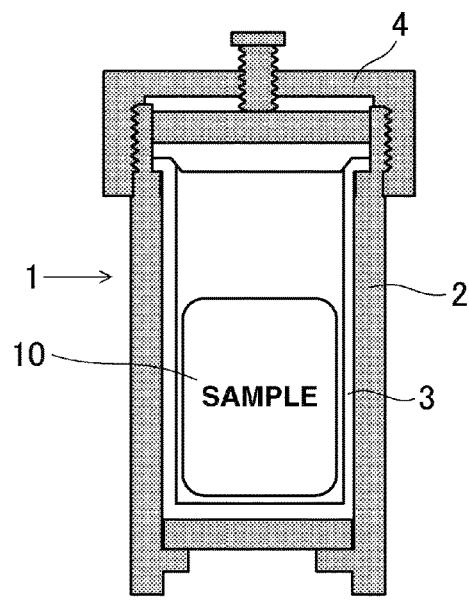
FIG. 1 shows a schematic cross-sectional view of an exemplary reactor that may be used to work the invention.

Embodiments of the inventive method for producing a complex fluoride phosphor are described below.

The phosphor production method according to the invention is a method for producing a red phosphor that is a manganese-activated complex fluoride represented by the formula (1) below:

$$A_2MF_6:Mn \qquad (1)$$

(wherein M is one or more tetravalent element selected from the group consisting of silicon, titanium, zirconium, hafnium, germanium and tin; and A is one or more alkali metal selected from the group consisting of lithium, sodium, potassium, rubidium and cesium, and includes at least sodium and/or potassium). The method is characterized by including the steps of: mixing together a solid of a complex fluoride represented by the formula (2) below:

$$A_2MF_6 \qquad (2)$$

(wherein M is one or more tetravalent element selected from the group consisting of silicon, titanium, zirconium, hafnium, germanium and tin; and A is one or more alkali metal selected from the group consisting of lithium, sodium, potassium, rubidium and cesium, and includes at least sodium and/or potassium) and a solid of a manganese compound represented by the formula (3) below:

$$A_2MnF_6 \qquad (3)$$

(wherein A is one or more alkali metal selected from the group consisting of lithium, sodium, potassium, rubidium and cesium, and includes at least sodium and/or potassium); and heating the mixture at a temperature of at least 100° C. and not above 500° C.

One of the complex fluorides used as a raw material in the invention is a complex fluoride of formula (2) above. A commercial product may be used as the complex fluoride of formula (2). Alternatively, this may be one prepared by adding a solution or solid of a water-soluble salt of the corresponding alkali metal A, such as a fluoride, chloride, nitrate, sulfate, carbonate, bicarbonate or hydroxide, to a solution of a compound represented by the formula (5) below:

$$H_2MF_6 \qquad (5)$$

(wherein M is one or more tetravalent element selected from among Si, Ti, Zr, Hf, Ge and Sn, and contains substantially no Mn).

The manganese raw material used in the invention is a hexafluoromanganate of formula (3) above. Use may be made of one prepared by any of the following methods: (A) the method described by H. Bode, H. Jenssen and F. Bandte in *Angew. Chem.* 65, p. 304 (1953) (Non-Patent Document 1) of reducing potassium permanganate with hydrogen peroxide in the presence of potassium fluoride; (B) the method described by R. Hoppe, W. Liebe and W. Daehne in *Z. Anorg. Allg. Chem.* 307, p. 276 (1961) (Non-Patent Document 2) of heating a mixture of manganese with an anhydrous chloride of an alkali metal in a stream of fluorine gas; (C) the methods described by B. Cox and A. G. Sharpe in *J. Chem. Soc., p.* 1798 (1954) (Non-Patent Document 3) and in *Shin Jikken Kagaku K•za* 8 [New experimental chemistry series 8] (edited by The Chemical Society of Japan): "Inorganic Compound Synthesis III," p. 1166 (Maruzen, Inc., 1977) (Non-Patent Document 4) of synthesis by an electrolytic reaction in a manganese fluoride-containing solution.

The mixing ratio of the raw material for tetravalent metal M and the raw material for manganese (Mn) is from 0.001 to 0.3 mole, preferably from 0.002 to 0.2 mole, and more preferably from 0.005 to 0.15 mole, of manganese per mole of M. At less than 0.001 mole, there is too little activator Mn in the phosphor product and so the emission characteristics are inadequate. When the level of manganese exceeds 0.3 mole, this too lowers the emission characteristics.

Any suitable method may be used to mix together these raw materials, such as placing both raw materials in a bag made of polyethylene or the like and shaking and rotating the contents; placing the raw materials in a container which is made of polyethylene or the like and has a lid, and setting the container on a rocking mixer or a tumbling mixer; and grinding together the raw materials in a mortar.

The reaction can be promoted by mixing a hydrogenfluoride represented by the formula (4) below $$A^1F.nHF \qquad (4)$$

(wherein $A^1$ is one or more alkali metal or ammonium selected from the group consisting of lithium, sodium, potassium, rubidium and $NH_4$; and n is a number that is at least 0.7 and not more than 4, and preferably at least 0.9 and not more than 2.5) as a solid together with the above mixture and heating. Commercial products such as ammonium hydrogenfluoride ($NH_4HF_2$), sodium hydrogenfluoride ($NaHF_2$) or potassium hydrogenfluoride ($KHF_2$), as well as KF.2HF and the like can be used as such hydrogenfluorides.

These hydrogenfluorides are added in an amount such that the alkali metal or ammonium represented by $A^1$ is preferably from 0 to 2.5 moles, and more preferably from 0.1 to 2.0 moles, per mole of the primary constituent metal M. Increasing the hydrogenfluoride to more than 2.5 moles provides no advantage in terms of phosphor formation and may result in the product clumping and being difficult to break up.

Although there is no limitation on the method used to mix the hydrogenfluorides, because heat generation may occur during mixture, it is desirable to avoid a method that grinds and mixes the materials together under a strong force, and to carry out mixture in a short period of time.

Mixture of the hydrogenfluoride may be carried out at the same time that the complex fluoride $A_2MF_6$ and the manganese raw material $A_2MnF_6$ are mixed together. However, in view of the foregoing points, it is preferable to mix the hydrogenfluoride afterward into a mixture obtained by first mixing together the $A_2MF_6$ and the $A_2MnF_6$.

In addition to a hydrogenfluoride, the use of a nitrate, sulfate, hydrogensulfate or fluoride of an alkali metal together with a hydrogenfluoride is also effective as a reaction promoter. The amount of addition in this case, in terms of moles, is preferably in a range that does not exceed the amount of hydrogenfluoride.

The raw materials that have been mixed together as described above are then heated. The heating temperature is from 100 to 500° C., preferably from 150 to 450° C., and more preferably from 170 to 400° C. The atmosphere during heating may be, for example, open air, nitrogen, argon or a vacuum, although a hydrogen-containing reducing atmosphere is undesirable because of the possibility of a decrease in the emission characteristics caused by reduction of the manganese.

Use may be made of either a method in which the mixed raw materials are placed in a closed vessel and, together with the vessel, set in a dryer, oven or the like, or a method in which, using a vessel having a gas vent, the raw materials are directly heated from the exterior with a heater. When a closed vessel is used, the portion of the vessel that comes into contact with the reactants is preferably made of fluoropolymer. Alternatively, in cases where the heating temperature is 270° C. or below, advantageous use can be made of a fluoropolymer vessel. When the heating temperature is higher than this, the use of a ceramic vessel is preferred. The ceramic in this case is preferably, for example, alumina, magnesia, or magnesium aluminum spinel.

Figure 6:
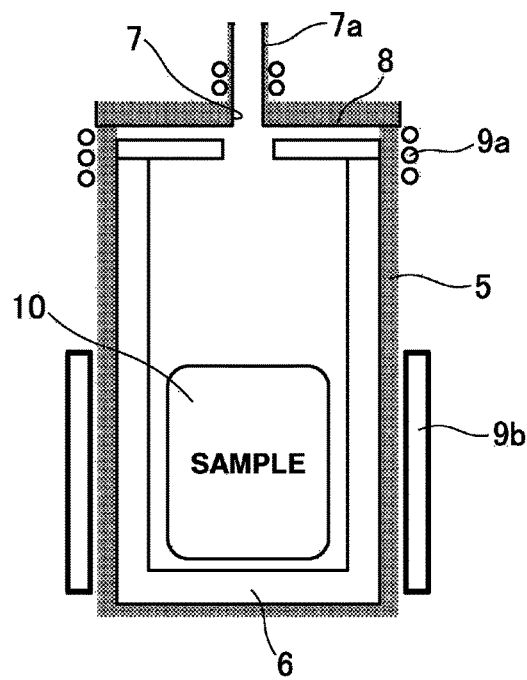
FIG. 6 is a schematic cross-sectional view showing another exemplary reactor that may be used to work the invention.

More specifically, it is preferable to use as the reactor the double vessel 1 shown in FIG. 1 having a stainless steel vessel body 2 on an inner wall of which is formed a polytetrafluoroethylene inner layer 3, and to heat and react the powder mixture 10 inside this vessel 1. It is preferable to use stainless steel as the material making up the lid 4. Use of the reactor shown in FIG. 6 is also effective. The reactor in FIG. 6 is a stainless steel (SUS) vessel 5 on an inner wall of which is formed a ceramic inner layer 6. A lid 8 which is coated with fluoropolymer and has a gas outlet port 7 formed at the center thereof is attached so as to cover an opening at the top end of the vessel 5. Cooling lines 9a made of stainless steel are provided at the outer periphery on the top end of the vessel 5 and at the outer periphery of a gas outlet line 7a that projects out from the gas outlet port 7. A heater 9b that heats the powder mixture 10 placed at the interior of the vessel 5 is provided peripheral to the bottom of the vessel 5.

There is a possibility that, in the reaction product thus obtained, unreacted hexafluoromanganate may be mixed in together with the complex fluoride phosphor that is the target product. When a hydrogenfluoride is added, this too may remain. These can be removed by washing.

An inorganic acid solution of, for example, hydrochloric acid, nitric acid or hydrofluoric acid, or a fluoride solution of ammonium fluoride, potassium fluoride or the like may be used for washing. A hydrofluoric acid or ammonium fluoride solution is more preferred. It is also possible to add a water-soluble organic solvent such as ethanol or acetone in order to keep the phosphor ingredients from dissolving out. Dissolving the $A_2MF_6$ serving as a raw material in the washing solution is also effective.

In the inventive method for producing a complex fluoride phosphor, as described above, a complex fluoride phosphor can be obtained by heating a mixture of the above raw material powders. Up to this stage, hydrofluoric acid has not been used in the production of complex fluoride phosphor. In this case, hydrofluoric acid may be used as a washing ingredient for washing the complex fluoride phosphor-containing reaction product obtained and removing unnecessary ingredients (powders of raw materials and reaction by-products other than the target complex fluoride phosphor). Even when hydrofluoric acid is used in this way, the amount of such use is small compared with use in the production of complex fluoride phosphors by conventional wet processes.

After washing as described above, the solids are dried in the usual manner, giving a manganese-activated complex fluoride.

The resulting complex fluoride has excellent emission characteristics comparable to those of manganese-activated complex fluorides obtained by conventional wet processes.

A method for treating a manganese-activated complex fluoride red phosphor that has already been fabricated is now described as another aspect of the invention. The red phosphor used is a manganese-activated complex fluoride represented by the formula (1) below:

(wherein M is one or more tetravalent element selected from among Si, Ti, Zr, Hf, Ge and Sn; and A is one or more alkali metal selected from among Li, Na, K, Rb and Cs, and includes at least Na and/or K). Any such red phosphor produced by various wet processes known to the art or by any dry process mentioned in this invention may be used.

A hydrogenfluoride represented by the formula (4) below:

(wherein $A^1$ is one or more alkali metal or ammonium selected from the group consisting of Li, Na, K, Rb and $NH_4$; and n is a number that is at least 0.7 and not more than 4) is mixed therein as a solid, and the resulting mixture is heated. Examples of such hydrogenfluorides that may be used here include commercial products such as ammonium hydrogenfluoride ($NH_4HF_2$), sodium hydrogenfluoride ($NaHF_2$) and potassium hydrogenfluoride ($KHF_2$), and also, for example, KF.2HF.

These hydrogenfluorides are added in an amount such that the alkali metal or the like serving as $A^1$ is preferably from 0.01 to 2.0 moles, and more preferably from 0.03 to 1.5 moles, per mole of the primary constituent metal M. At above 2.0 moles, there is nothing to be gained from further increasing the amount of hydrogenfluoride.

Although there is no limitation on the method used to mix in this hydrogenfluoride, because heat generation may occur during mixing, it is desirable to avoid a method that grinds and mixes the materials together under a strong force, and to carry out mixture in a short period of time.

Methods similar to those in the phosphor production method described above may be used in such operations as addition of the reaction promoters, heating, and washing and recovery after heating, and these operations may be carried out in general accordance with the above-described methods.

EXAMPLES

The invention is illustrated more fully below by way of Examples and Comparative Examples, although these Examples are not intended to limit the invention.

Example 1

Potassium hexafluorosilicate powder (Morita Chemical Industries Co., Ltd., $K_2SiF_6$), 26.43 g, and potassium hexafluoromanganate powder (produced by the method described subsequently in Reference Example 1; $K_2MnF_6$), 2.46 g, were placed in the same zippered polyethylene bag and mixed for 5 minutes by manually shaking and slowly rotating the bag. The mixing ratio corresponded to 0.083 mole of manganese per mole of silicon.

To this mixed powder was further added 14.06 g of potassium hydrogenfluoride powder (acidic potassium fluoride from Stella Chemifa Corporation; $KHF_2$), followed by mixture in the same way as above. The mixing ratio corresponded to 1.5 moles of $KHF_2$ per mole of silicon. Of this powder mixture, 2.0 g (mixed powder) was set aside for subsequent evaluation.

The powder mixture was placed in the double vessel 1 shown in FIG. 1, which was then tightly closed. Here, in FIG. 1, the double vessel 1 has a stainless steel (SUS) vessel body 2 on an inner wall of which is formed a polytetrafluoroethylene inner layer 3. The powder mixture 10 was placed inside this double vessel 1, which was then tightly closed with a stainless steel lid 4, placed in an oven and heated. The temperature was maintained at 250° C. for 12 hours, after which the vessel was allowed to cool down.

Some of the cooled reaction product was in powder form, but because most of it was in the form of a mass, this was coarsely crushed and mixed, and 2.0 g was removed for evaluation. The removed portion was additionally ground up thoroughly in a mortar (heated, unwashed powder).

A solution of 4.1 g of potassium hexafluorosilicate dissolved in 100 cm³ of 50 wt % hydrofluoric acid (SA-X, from Stella Chemifa Corporation; referred to below as "50 wt % HF") was prepared as a washing solution. The balance of the above reaction mixture was added to 75 cm³ of this solution, and stirred therein for 10 minutes. The clumps broke up into powder.

The precipitate that had become a powder was separated off by filtration with a Büchner funnel, and was then washed by sprinkling over it what remained of the washing solution prepared earlier. The precipitate was additionally washed with acetone and recovered, then vacuum dried, giving 28.2 g of a powder product (washed and dried powder). The particle size distribution of this powder product was measured with a flow dispersion-type laser diffraction particle size analyzer (Helos and Rodos, from Sympatec GmbH). As a result, particles having a size of 8.6 µm or less accounted for 10% of the total volume ($D_{10}$=8.6 µm), particles having a size of 21.3 µm or less accounted for 50% of the total volume ($D_{50}$=21.3 µm), and particles having a size of 33.7 µm or less accounted for 90% of the total volume ($D_{90}$=33.7 µm).

Figure 2:
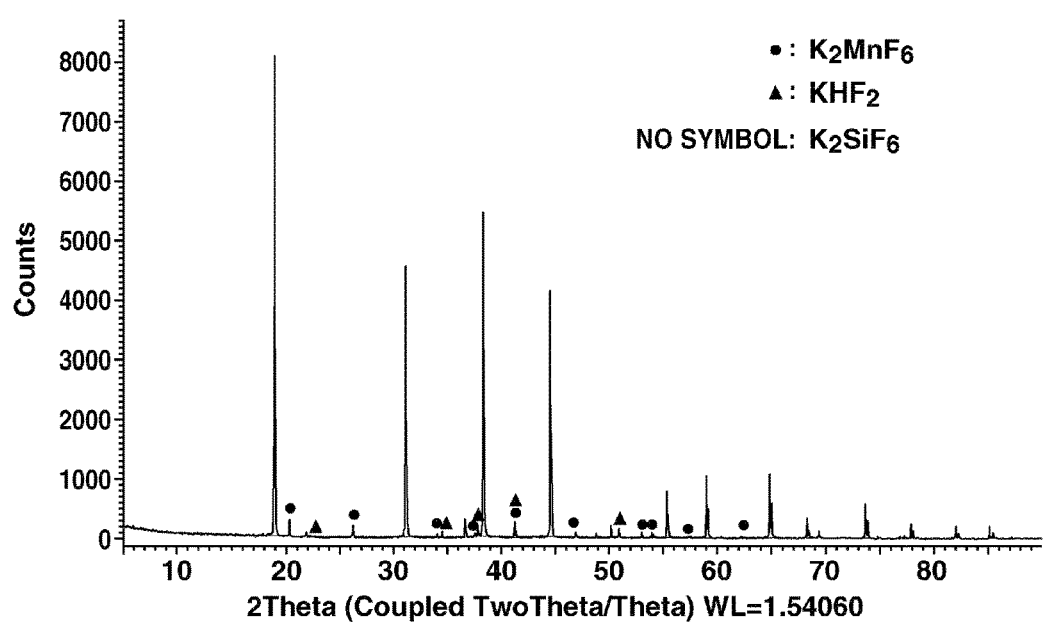
FIG. 2 is a powder x-ray diffraction pattern of the mixed powder obtained in Example 1.

FIG. 2 shows the powder x-ray diffraction pattern for this mixed powder. Assignments of the peaks identified by referring to databases are indicated by symbols. In addition to $K_2SiF_6$, $K_2MnF_6$ and $KHF_2$ were also observed.

Figure 3:
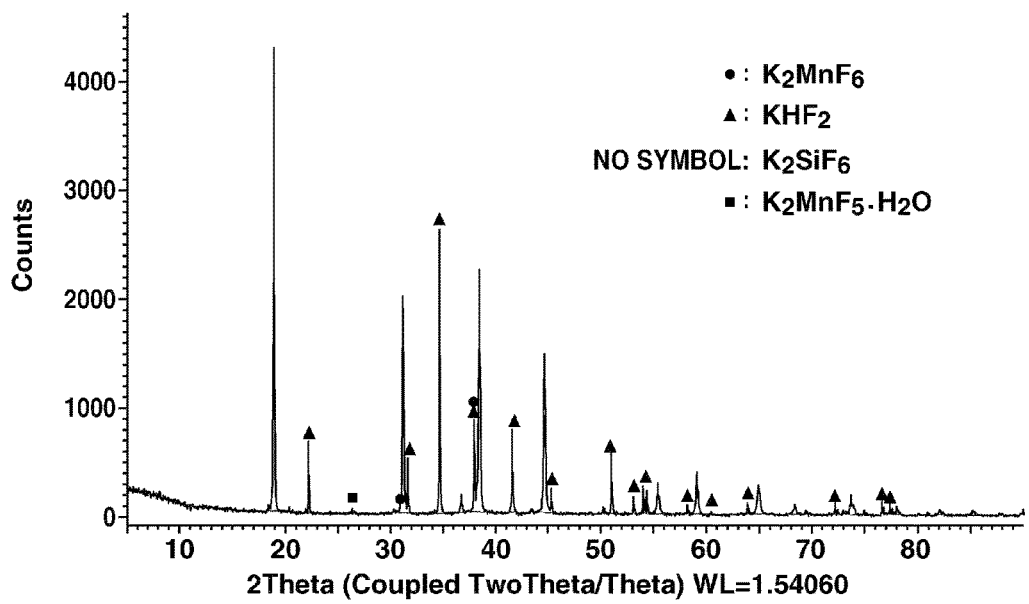
FIG. 3 is a powder x-ray diffraction pattern of the heated, unwashed powder obtained in the same example (Example 1).

Next, FIG. 3 shows the powder x-ray diffraction pattern of the heated, unwashed powder. The ratios of the $KHF_2$ peaks have become larger, whereas the $K_2MnF_6$ peaks are much weaker than in FIG. 2 for the mixed powder. A peak near 2θ=34° that does not overlap with the peaks for other compounds is clearly distinguishable. It can be assumed that the Mn has been incorporated into the $K_2SiF_6$, and that the amount of $K_2MnF_6$ has decreased.

Figure 4:
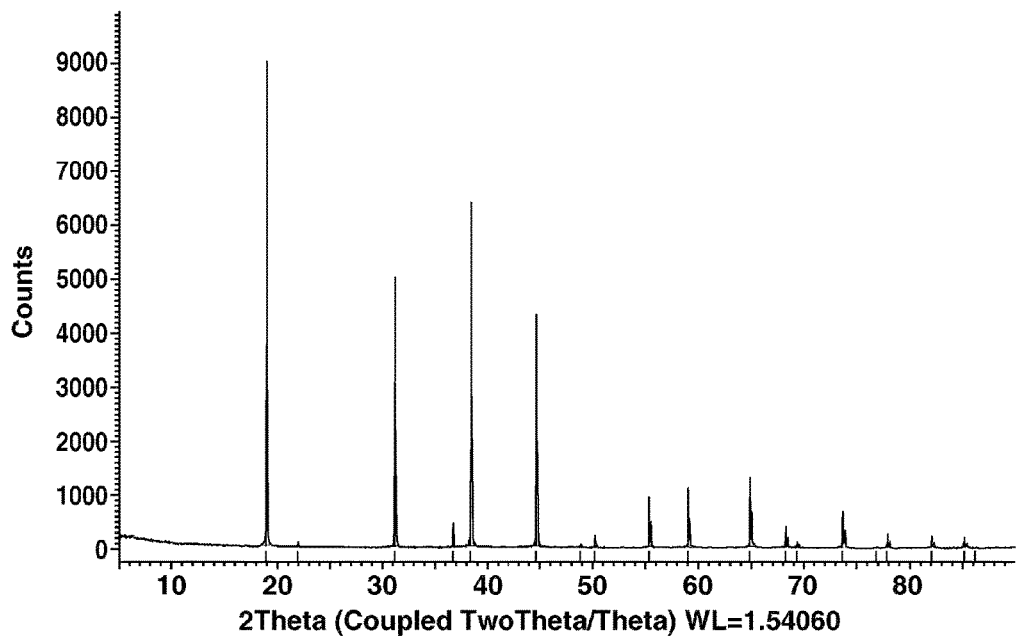
FIG. 4 is a powder x-ray diffraction pattern of the washed and dried powder obtained in the same example (Example 1).

In addition, FIG. 4 shows the powder x-ray diffraction pattern for the washed and dried powder. This agrees with the pattern for $K_2SiF_6$ in the International Centre for Diffraction Data (ICDD) powder x-ray diffraction database PDF01-075-0694, and no impurities are observable. It is apparent that the $KHF_2$ was removed by washing.

Figure 5:
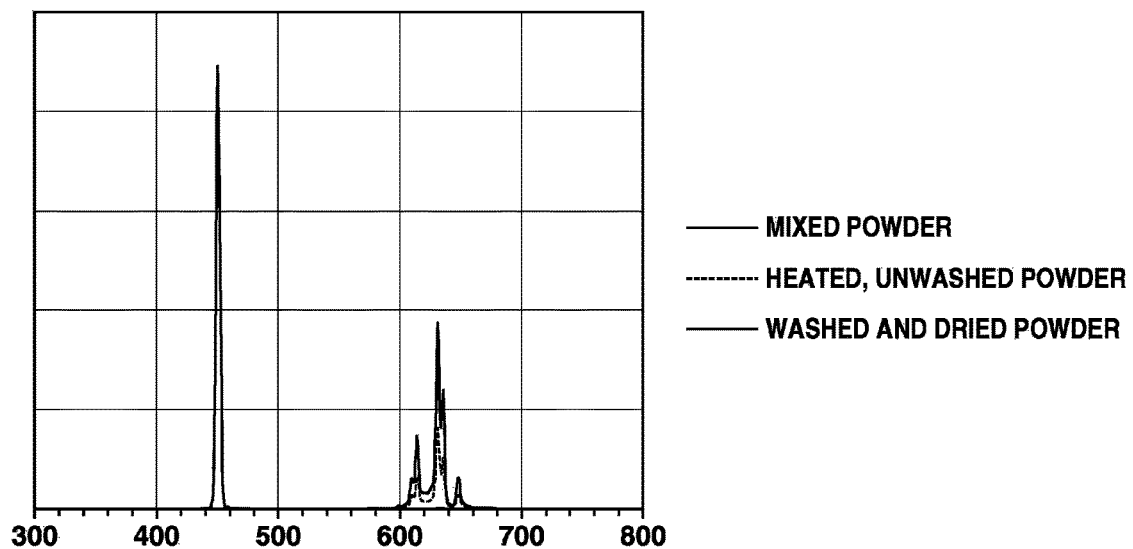
FIG. 5 is an excitation light and fluorescence spectrum of the mixed powder, the heated and unwashed powder, and the washed and dried powder in the same example (Example 1).

The emission spectra for the powder samples at each of these steps were measured at an excitation wavelength of 450 nm using the QE1100 Quantum Efficiency Measurement System (Otsuka Electronics Co., Ltd.). The excitation light and fluorescence spectra are shown in FIG. 5. The mixed powder does not exhibit luminescence, but the heated, unwashed powder exhibits red luminescence. This luminescence has increased due to washing and drying.

The absorptances and internal quantum efficiencies under 450 nm excitation measured by the same instrument are shown in Table 1.

TABLE 1

|  | Absorptance | Internal quantum efficiency |
| --- | --- | --- |
| Mixed powder | 0.686 | 0.000 |
| Heated, unwashed powder | 0.767 | 0.325 |
| Washed and dried powder | 0.697 | 0.759 |

Taken together, the x-ray diffraction and emission characteristics appear to indicate that the phosphors have formed in the heating step prior to washing.

Reference Example 1

Preparation of $K_2MnF_6$

Preparation was carried out by the following method, in general accordance with the method described in Non-Patent Document 4.

An ion-exchange membrane partition (diaphragm) made of fluoropolymer was provided at the center of a polyvinyl chloride reactor, and an anode and a cathode, each composed of a platinum sheet, were provided in the two chambers on either side of the ion-exchange membrane. An aqueous solution of hydrofluoric acid in which manganese(II) fluoride had been dissolved was placed on the anode side of the reactor, and an aqueous solution of hydrofluoric acid was placed on the cathode side. Both electrodes were connected to a power supply and electrolysis was carried out at a voltage of 3V and a current of 0.75 A. Following the completion of electrolysis, a saturated solution of potassium fluoride in aqueous hydrofluoric acid was added in excess to the reaction liquid on the anode side. The yellow-colored solid product that formed was separated off by filtration and collected, giving $K_2MnF_6$.

Example 2

Aside from changing the amount of potassium hydrogenfluoride from 14.06 g to 11.72 g and adding 4.08 g of potassium hydrogensulfate (Wako Pure Chemical guaranteed reagent, $KHSO_4$), 31.0 g of $K_2SiF_6$:Mn powder product was obtained in the same way as in Example 1. The particle size distribution results measured in the same way as in Example 1 were as follows: $D_{10}$=8.2 µm, $D_{50}$=22.1 µm, $D_{90}$=35.4 µm.

Example 3

Aside from changing the amount of potassium hydrogenfluoride from 14.06 g to 11.72 g and adding 3.03 g of potassium nitrate (Wako Pure Chemical guaranteed reagent, $KNO_3$), 30.4 g of $K_2SiF_6$:Mn powder product was obtained in the same way as in Example 1. The particle size distribution results measured in the same way as in Example 1 were as follows: $D_{10}$=6.9 µm, $D_{50}$=20.0 µm, $D_{90}$=31.0 µm.

Example 4

$K_2SiF_6$ powder (26.43 g) and 1.23 g of the same $K_2MnF_6$ powder as in Example 1 were placed in an identical zippered polyethylene bag and mixed for 5 minutes by manually shaking and slowly rotating the bag. The mixing ratio corresponded to 0.042 mole of manganese per mole of silicon.

This mixture was placed in a magnesia crucible, which was then placed in a stainless steel outer vessel that was in turn placed in a temperature-controlled tube furnace. The furnace was set in a draft chamber, an opening for venting any gases that form was provided at the interior of the stainless steel vessel, and holes were formed as well in the lid on the magnesia crucible. The outlet portion of the stainless steel vessel not situated within the tube furnace was wrapped with stainless steel tubing to enable cooling by the passage of water therethrough. This reactor setup is shown in FIG. 6. Using this setup, heating was carried out at 300° C. for 8 hours, after which the system was allowed to cool. The reaction product was removed, ground up and recovered, giving 30.2 g of a $K_2SiF_6$:Mn powder product. The particle size distribution results measured in the same way as in Example 1 were as follows: $D_{10}$=7.3 µm, $D_{50}$=16.7 µm, $D_{90}$=37.5 µm.

Example 5

$K_2SiF_6$ and $K_2MnF_6$ were mixed together in the same amounts as in Example 4. Ammonium hydrogenfluoride (from Stella Chemifa Corporation, $NH_2HF_2$), 6.85 g, was further added and mixed therein. The resulting mixture was charged into the same reactor as in Example 4 (FIG. 6) and heated at 350° C. for 6 hours. After cooling, the reaction mixture was removed, added to a mixture of 10 cm³ of 35 wt % hydrochloric acid (electronics grade reagent from Wako Pure Chemical Industries, HCl) and 70 cm³ of ethanol, and stirred. The precipitate was separated off by filtration with a Büchner funnel, washed with acetone and recovered, then vacuum dried, giving 32.7 g of a $K_2SiF_6$:Mn powder product. The particle size distribution results measured in the same way as in Example 1 were as follows: $D_{10}$=9.1 µm, $D_{50}$=18.0 µm, $D_{90}$=32.5 µm.

Example 6

$K_2SiF_6$ and $K_2MnF_6$ were mixed together in the same amounts as in Example 4. $KHF_2$ (7.03 g) was further added and mixed therein. This mixture was heated in the same way as in Example 5. After cooling, the reaction mixture was removed, added to 80 cm³ of a 40 wt % ammonium fluoride solution (Morita Chemical Industries Co., Ltd.; semiconductor grade; $NH_4F$), and stirred. The precipitate was separated off by filtration with a Büchner funnel, washed with acetone and recovered, then vacuum dried, giving 32.3 g of a $K_2SiF_6$:Mn powder product. The particle size distribution results measured in the same way as in Example 1 were as follows: $D_{10}$=8.9 µm, $D_{50}$=18.6 µm, $D_{90}$=28.1 µm.

Example 7

Aside from using 28.8 g of potassium hexafluorotitanate powder (Morita Chemical Industries Co., Ltd.; $K_2TiF_6$), 1.48 g of the same $K_2MnF_6$ as in Example 1 and 9.37 g of $KHF_2$, mixing was carried out in the same way as in Example 1 and the mixture was heated under the same conditions. After cooling, the reaction mixture was removed, added to a mixture of 10 cm$^3$ of 50 wt % HF and 70 cm$^3$ of acetone, and stirred for 10 minutes. The powdery precipitate was separated off by filtration with a Büchner funnel, washed with acetone and recovered, then vacuum dried, giving 32.7 g of a $K_2TiF_6$:Mn powder product. The particle size distribution results measured in the same way as in Example 1 were as follows: $D_{10}$=9.9 µm, $D_{50}$=38.2 µm, $D_{90}$=72.6 µm.

Example 8

Aside from using 22.56 g of sodium hexafluorosilicate powder (Morita Chemical Industries Co., Ltd.; $Na_2SiF_6$), using 2.14 g of sodium hexafluoromanganate (prepared by the method in subsequently described Reference Example 2; $Na_2MnF_6$), and using 9.36 g of sodium hydrogenfluoride (Stella Chemifa Corporation; $NaHF_2$) instead of potassium hydrogenfluoride, mixing was carried out in the same way as in Example 1 and the mixture was heated under the same conditions. After cooling, the reaction mixture was recovered and coarsely crushed.

In a separate operation, a solution of 2.8 g of potassium fluorosilicate dissolved in 100 cm$^3$ of 50 wt % HF was prepared. The above reaction mixture was added to 75 cm$^3$ of this solution and the resulting mixture was stirred for 10 minutes, during which time the clumps broke up into powder. The powdery precipitate was separated off by filtration with a Büchner funnel, and was then washed by sprinkling over it what remained of the washing solution prepared earlier. The precipitate was additionally washed with acetone and recovered, then vacuum dried, giving 25.6 g of a $Na_2SiF_6$:Mn powder product. The particle size distribution results measured in the same way as in Example 1 were as follows: $D_{10}$=6.2 µm, $D_{50}$=29.7 µm, $D_{90}$=56.1 µm.

Reference Example 2

Preparation of $Na_2MnF_6$

Using the same electrolysis reactor as in the preparation of $K_2MnF_6$ in Reference Example 1, the reaction was carried out in the same way, other than adding sodium fluoride instead of potassium fluoride. The yellow solid product that formed was separated off by filtration and recovered, giving $Na_2MnF_6$.

Example 9

Aside from adding 11.77 g of the hydrogenfluoride KF.2HF (Morita Chemical Industries Co., Ltd.) instead of potassium hydrogenfluoride ($KHF_2$) and changing the added amount of potassium hexafluoromanganate powder to 0.99 g, 29.9 g of a $K_2SiF_6$:Mn powder product was obtained in the same way as in Example 1. The particle size distribution results measured in the same way as in Example 1 were as follows: $D_{10}$=18.1 µm, $D_{50}$=27.8 µm, $D_{90}$=40.9 µm.

Comparative Example 1

A silicon, fluorine and manganese-containing aqueous solution (first solution) was prepared by first mixing 15.6 cm$^3$ of a 40 wt % fluorosilicic acid ($H_2SiF_6$) solution in water (Morita Chemical Industries Co., Ltd.) with 100 cm$^3$ of 50 wt % HF, then adding to this 1.19 g of the same $K_2MnF_6$ powder as in Example 1 and stirring to effect dissolution. In addition, a potassium fluoride-containing aqueous solution (second solution) was prepared by dissolving 13.95 g of potassium fluoride in 40 cm$^3$ of 50 wt % HF and allowing the solution to cool to room temperature. Next, the second solution was added a little at a time over about 3 minutes to the stirred first solution, and the mixture was stirred for about 10 minutes, whereupon a light orange-colored solid formed. This solid product was separated off by filtration, washed with acetone and vacuum dried, giving 15.64 g of a $K_2SiF_6$:Mn powder product. The particle size distribution results measured in the same way as in Example 1 were as follows: $D_{10}$=15.1 µm, $D_{50}$=36.9 µm, $D_{90}$=60.3 µm.

Comparative Example 2

A titanium, fluorine and manganese-containing aqueous solution (first solution) was prepared by first mixing 15.6 cm$^3$ of a 40 wt % hexafluorotitanic acid ($H_2TiF_6$) solution in water (Morita Chemical Industries Co., Ltd.) with 100 cm$^3$ of 50 wt % HF, then adding to this 0.74 g of the same $K_2MnF_6$ powder as in Example 1 and stirring to effect dissolution. In addition, a potassium fluoride-containing aqueous solution (second solution) was prepared by dissolving 23.43 g of $KHF_2$ in 22 cm$^3$ of 50 wt % HF and 34 cm$^3$ of pure water. Next, the second solution was added a little at a time over about 2 minutes to the stirred first solution, and the mixture was stirred for about. 10 minutes, whereupon a light orange-colored solid formed. This solid product was separated off by filtration, washed with acetone and vacuum dried, giving 13.73 g of a $K_2TiF_6$:Mn powder product. The particle size distribution results measured in the same way as in Example 1 were as follows: $D_{10}$=13.6 µm, $D_{50}$=46.5 µm, $D_{90}$=103.2 µm.

Example 10

First, 234 cm$^3$ of a 40 wt % solution of fluorosilicic acid ($H_2SiF_6$) in water (Morita Chemical Industries Co., Ltd.) was mixed together with 2,660 cm$^3$ of 50 wt % hydrofluoric acid (HF) (SA-X, from Stella Chemifa Corporation). To this was added 13.32 g of $K_2MnF_6$ powder prepared beforehand by the above-described method, and the mixture was stirred to effect dissolution (first solution).

In a separate operation, 210.5 g of potassium hydrogenfluoride ($KHF_2$) was mixed with 680 cm$^3$ of a 50 wt % solution of hydrofluoric acid in water and 1,270 cm$^3$ of pure water (second solution).

While stirring the first solution, the second solution was added a little at a time, whereupon a light orange-colored precipitate formed. This precipitate was separated off by filtration with a Büchner funnel and thoroughly drained of liquid, following which it was washed by sprinkling acetone thereon, and then drained, recovered and vacuum dried, giving 184.9 g of a powder product.

Of this powder, 26.43 g was collected and 1.96 g of the hydrogenfluoride KF.2HF was mixed therein. The mixture was placed in a vessel like that in Example 1 and heated under the same conditions, following which the same operations were carried out, giving 26.87 g of phosphor. The particle size distribution results measured in the same way as in Example 1 were as follows: $D_{10}$=13.1 µm, $D_{50}$=25.8 µm, $D_{90}$=39.7 µm.

Comparative Example 3

In Example 10, the remainder that was subjected only to precipitation, filtration, washing and vacuum drying and was not used in heat treatment was collected. The particle size distribution results measured in the same way as in Example 1 were as follows: $D_{10}$=8.4 μm, $D_{50}$=19.2 μm, $D_{90}$=29.3 μm.

Evaluation Experiment 1

The emission characteristics of the phosphors obtained in the Examples and Comparative Examples were measured with the QE1100 Quantum Efficiency Measurement System (Otsuka Electronics Co., Ltd.) mentioned in Example 1. The absorptances and quantum efficiencies at an excitation wavelength of 450 nm are shown in Table 2.

TABLE 2

|  | Absorptance | Internal quantum efficiency |
| --- | --- | --- |
| Example 1 | 0.697 | 0.759 |
| Example 2 | 0.767 | 0.603 |
| Example 3 | 0.663 | 0.724 |
| Example 4 | 0.628 | 0.774 |
| Example 5 | 0.580 | 0.620 |
| Example 6 | 0.592 | 0.745 |
| Example 7 | 0.725 | 0.745 |
| Example 8 | 0.612 | 0.734 |
| Example 9 | 0.712 | 0.818 |
| Example 10 | 0.680 | 0.884 |
| Comparative Example 1 | 0.701 | 0.717 |
| Comparative Example 2 | 0.663 | 0.643 |
| Comparative Example 3 | 0.639 | 0.852 |

Evaluation Experiment 2

Durability tests were carried out on the phosphors obtained in the Examples and Comparative Examples.

The phosphor was placed as a powder in a small dish without a lid and, as the durability test, was left at rest for 30 minutes or for 7 days in a test chamber (Espec Corporation) maintained at a temperature of 65° C. and 90% relative humidity, after which the internal quantum efficiency was measured in the same way as in Evaluation Experiment 1. The results are shown in Table 3.

TABLE 3

|  | Initial | Durability test | |
| --- | --- | --- | --- |
|  |  | 30 minutes | 7 days |
| Example 1 | 0.759 | 0.702 | 0.689 |
| Example 9 | 0.818 | 0.809 | 0.805 |
| Example 10 | 0.884 | 0.856 | 0.842 |
| Comparative Example 3 | 0.852 | 0.684 | 0.677 |

Evaluation Experiment 3

Figure 7:
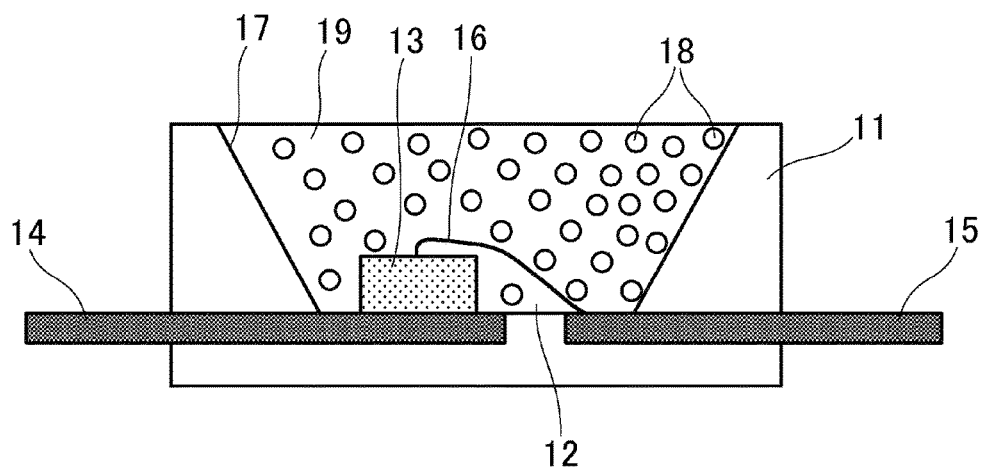
FIG. 7 is a schematic cross-sectional view of a light-emitting device for testing that is used in Evaluation Experiment 3.

The light-emitting device for testing shown in FIG. 7 was built. In FIG. 7, an opaque base housing 11 has a recess 12 therein, and a chip 13 is positioned on a bottom surface within the recess 12. The chip 13 is an InGaN blue-emitting diode having an emission peak wavelength of 450 nm and a half-peak width of 20 nm. In the diagram, 14 and 15 are each electric lines embedded in the base housing 11, one electric line 14 being in electrical contact with a bottom electrode of the chip 13, and the other electric line 15 being connected via a bonding wire 16 to a top electrode of the chip 13. The wall 17 of the recess 12 in the base housing 11 is configured so as to reflect visible light. The interior of the recess 12 is filled with a cured thermoset resin 19 obtained from a liquid thermoset resin premixed with a phosphor 18, thus encapsulating the chip 13.

In the experiment, 10 parts by weight of a silicone resin (LPS-5547, from Shin-Etsu Chemical Co., Ltd.) as the thermoset resin and 4 parts by weight of the complex fluoride red phosphors obtained in Examples and Comparative Examples as the phosphor were mixed together and used. This mixture was poured into the recess in the base housing and then cured by 4 hours of heating at 150° C.

First, the emission color of the fabricated LED was measured with Total Luminous Flux Measurement System manufactured by Otsuka Electronics Co., Ltd. The color was expressed in terms of CIE color coordinates (x,y). Next, in a thermostatic chamber at 85° C., a 0.2 A current was continuously passed through the LED for 100 hours, following which the emission color was measured again in the same way. The product dxdy of the change in x (dx) and the change in y (dy) after 100 hours relative to the initial value was determined. A similar test was carried out also at 60° C. and 90% relative humidity. The results are shown in Table 4.

TABLE 4

|  | dxdy (100 hours) | |
| --- | --- | --- |
|  | 85° C. | 60° C., 90% RH |
| Example 9 | 0.0031 | 0.0025 |
| Example 10 | 0.0028 | 0.0023 |
| Comparative Example 3 | 0.0089 | 0.0064 |

Table 5 shows the results obtained from comparing the amount of 50 wt % hydrofluoric acid used per 100 g of phosphor ($K_2SiF_6$:Mn, etc.) in conventional known methods and in this invention. The invention includes in this amount the hydrofluoric acid used in washing. The amount used in the production of manganese intermediate as a raw material for phosphor production was not included in any of the Examples. Comparative Example is also Example 1 of Patent Document 4, Reference Example 3 is Example 5 of Patent Document 2, and Reference Example 4 is Examples 1 to 9 of Patent Document 3.

TABLE 5

|  | Amount of 50% HF used per 100 g of phosphor (cm³) |
| --- | --- |
| Example 1 | 354 |
| Example 2 | 322 |
| Example 3 | 329 |
| Example 4 | 0 |
| Example 5 | 0 |
| Example 6 | 0* (40% $NH_4F$, 248) |
| Example 7 | 31 |
| Example 8 | 391 |
| Example 9 | 334 |
| Comparative Example 1 | 895 |
| Comparative Example 3 | 1,810 |
| Reference Example 3 | 10,700 |
| Reference Example 4 | 847 |

*Example 6 does not use hydrofluoric acid. However, for the sake of reference, the amount of 40 wt % ammonium fluoride solution used is indicated.

Although some preferred embodiments of the invention have been described above, the invention is not limited thereby, various modifications such as other embodiments, additions, deletions and substitutions being possible within a range conceivable by those skilled in the art, insofar as all such variations exhibit the operation and advantageous effects of the invention and are encompassed within the scope of the invention.

REFERENCE SIGNS LIST

1 Double vessel
2 Vessel body
3 Inner layer
4 Lid
5 Vessel
6 Inner layer
7 Gas outlet port
7a Gas outlet line
8 Lid
9a Cooling line
9b Heater
10 Powder mixture
11 Base housing
12 Recess
13 Chip
14 Electrical line
15 Electrical line
16 Bonding wire
17 Wall
18 Phosphor
19 Thermoset resin

The invention claimed is:

1. A method for producing a red phosphor that is a manganese-activated complex fluoride represented by the formula (1):

$$A_2MF_6:Mn \tag{1}$$

wherein M is one or more tetravalent element selected from the group consisting of silicon, titanium, zirconium, hafnium, germanium and tin, and A is one or more alkali metal selected from the group consisting of lithium, sodium, potassium, rubidium and cesium, and includes at least sodium and/or potassium, the method comprising the steps of:

mixing, as reaction raw materials, a solid of a complex fluoride represented by the formula (2):

$$A_2MF_6 \tag{2}$$

wherein M is one or more tetravalent element selected from the group consisting of silicon, titanium, zirconium, hafnium, germanium and tin, and A is one or more alkali metal selected from the group consisting of lithium, sodium, potassium, rubidium and cesium, and includes at least sodium and/or potassium, and a solid of a manganese compound represented by the formula (3):

$$A_2MnF_6 \tag{3}$$

wherein A is one or more alkali metal selected from the group consisting of lithium, sodium, potassium, rubidium and cesium, and includes at least sodium and/or potassium, and heating the mixture at a temperature of at least 100° C. and not above 500° C., wherein the mixture is combined with a solid of a hydrogenfluoride represented by the formula (4):

$$A^1F \cdot nHF \tag{4}$$

wherein $A^1$ is one or more alkali metal or ammonium selected from the group consisting of sodium, potassium, rubidium and $NH_4$, and n is a number that is at least 0.7 and not more than 4, and heating the mixture.

2. The method for producing a manganese-activated complex fluoride phosphor of claim 1, wherein the reaction raw materials are heated and reacted in a ceramic vessel, or in a reaction vessel having a portion formed of fluoropolymer that comes into contact with the mixture.

3. The method for producing a manganese-activated complex fluoride phosphor of claim 1, wherein the reaction mixture obtained by heating is washed with an inorganic acid solution or a fluoride solution to remove unnecessary components, and then performing solid-liquid separation and drying the solid.

4. A method for treating a manganese-activated complex fluoride phosphor, comprising the steps of:

mixing a red phosphor that is a manganese-activated complex fluoride represented by the formula (1):

$$A_2MF_6:Mn \tag{1}$$

wherein M is one or more tetravalent element selected from the group consisting of silicon, titanium, zirconium, hafnium, germanium and tin, and A is one or more alkali metal selected from the group consisting of lithium, sodium, potassium, rubidium and cesium, and includes at least sodium and/or potassium, and a solid of a hydrogenfluoride represented by the formula (4):

$$A^1F \cdot nHF \tag{4}$$

wherein $A^1$ is one or more alkali metal or ammonium selected from the group consisting of sodium, potassium, rubidium and $NH_4$, and n is a number that is at least 0.7 and not more than 4, and heating the mixture.

5. The method for treating a manganese-activated complex fluoride phosphor of claim 4, wherein the reaction raw materials are heated and reacted in a ceramic vessel, or in a reaction vessel having a portion formed of fluoropolymer that comes into contact with the mixture.

6. The method for treating a manganese-activated complex fluoride phosphor of claim 4, wherein the reaction mixture obtained by heating is washed with an inorganic acid solution or a fluoride solution to remove unnecessary components, and then performing solid-liquid separation and drying the solid.

* * * * *